2,970,051

PROCESS FOR THE SEPARATION OF LEAD FROM SOLUTIONS

Vladimir Nicolaus Mackiw and Nicolas Zubryckyj, Fort Saskatchewan, Alberta, Canada, assignors to Sherritt Gordon Mines Limited, Toronto, Ontario, Canada, a company of Ontario No Drawing. Filed May 1, 1959, Ser. No. 810,268

7 Claims. (Cl. 75—120)

This invention relates to a hydrometallurgical method of separating lead from a solution which contains dissolved values of lead as an impurity and dissolved values of at least one other non-ferrous metal which are to be recovered from the solution substantially free from contamination by lead.

Methods are known and are in commercial use in which values of non-ferrous metals are extracted from metal bearing material and are dissolved in a leach solution from which they are ultimately recovered as product metals suitable for use in industry, such as by electrolysis or by reacting the solution with a sulphur free reducing gas at elevated temperature and pressure.

A problem is encountered in the production of non-ferrous metals, particularly of the group silver, copper, nickel and cobalt, substantially free from impurities from a solution which contains lead in addition to the dissolved salt of the metal of interest. The problem is that while salts of lead such as lead carbonate and lead sulphate normally are considered as insoluble in and report in the undissolved residue in conventional leaching processes, it is found, in actual practice, that some lead is dissolved in the solution or is present in the solution as a colloid which cannot be separated from the solution by known liquid-solids separation procedures. As examples of this problem, it is found that in leaching lead bearing, copper scrap material with an ammoniacal ammonium carbonate leach solution, substantial quantities of lead are dissolved or are present in collodial condition in the solution. The same phenomenon is noted in the use of ammoniacal ammonium sulphate leach solutions. Lead which is present in the solution as a dissolved salt or in collodial form tends to precipitate with the metal of interest and thus contaminates its purity. This problem is particularly acute in the treatment of metal bearing material for the economic production of a product non-ferrous metal which contains less than 0.01% lead, by weight.

We have found that lead which is contained in a solution which contains, also, a dissolved salt of one or more other non-ferrous metals, for example, silver, copper, nickel and cobalt, can be substantially completely separated therefrom without appreciable loss of desired non-ferrous metal values by contacting the solution with a metal hydroxide which is insoluble in the solution.

The improved process is based on extensive investigations in which the effect of various addition agents were examined and is independent of theoretical or hypothetical considerations. A reasonable explanation of the phenomenon is, however, that the added hydroxide which is insoluble in the solution forms flocs which are distributed throughout the solution on which the lead is adsorbed and these flocs with adsorbed lead values can be separated from the solution relatively easily by a conventional liquid-solids separation step, such as by filtration. The only apparent limitation on the hydroxides which can be employed in this improved process is that they must be insoluble in the solution subjected to treatment, otherwise no flocs are formed for the adsorption of the lead values. Thus, an acid, alkaline or a neutral solution can be treated by this process for the separation of lead values provided the hydroxide is insoluble in the solution.

While all metal hydroxides which are insoluble in the solution of interest serve to collect or adsorb lead from the solution, some have better collection or adsorption capacity or activity than others. Of the large group of hydroxides tested, the best results have been obtained from the use of iron, titanium, manganese and vanadium hydroxides while others such as zinc, aluminum, chromium, bismuth, adsorb at least some of the lead from the solution.

The process is, of course, independent of the source of the metal hydroxide or the manner in which it is produced. For example, the metal hydroxide can be purchased in the form in which it is used. Alternatively, the metal hydroxide can be prepared by dissolving the metal component in an acid solution, such as an acid sulphate or acid chloride solution, and precipitated from the solution as a metal hydroxide by reacting the acid solution with a hydroxide, such as sodium, potassium or ammonium hydroxide. Precipitated metal hydroxide can be separated from the solution and, after washing, is ready for use.

There are several ways in which the metal hydroxide is employed. It can be dispersed in the solution subjected to treatment, such as by agitation. Alternatively, as the solution, after treatment, usually is subjected to a liquid-solids separation, such as filtration, it is found that excellent results are obtained also by applying the metal hydroxide as a film or coating to the filtering medium.

When the metal hydroxide is dispersed in the solution, the temperature at which the treamtent is conducted and the agitation of the solution do not appear to affect the extent to which the lead content of the solution is reduced, provided, of course, that the metal hydroxide flocs are more or less uniformly dispersed throughout the solution. Similar results were obtained at temperatures within the range of from 65° to 180° F. and with agitation during time periods within the range of from 5 to 60 minutes. Also, it is found that similar results are obtained by the use of freshly precipitated metal hydroxide and moderately aged metal hydroxides.

The following examples illustrate the results obtained in separating lead from an ammoniacal solution which contained dissolved copper values. The solution was rerived from leaching copper scrap which contained lead, such as scrap automobile radiators, with an ammoniacal amonium carbonate solution.

EXAMPLE 1

A solution which contained 124 grams per litre copper, 0.5 gram per litre lead, 115 grams per litre total ammonia and 85 grams per litre total carbon dioxide was treated with different types of metal hydroxides. In each instance, the metal hydroxide was dispersed in the solution which was then agitated for 15 minutes at 75° F. Solids were separated from the solution by filtration. The copper, lead and metal ion of the added metal hydroxide contents of the solution and the solids were determined by analyses. The results obtained by the use of the different hydroxides are set out in Table 1. In the first two experiments in which vanadyl hydroxide was dispersed in the solution, 5,000 ml. samples of the solution were employed. 2,000 ml. samples were employed in the remainder of the examples.

Table 1

| Adsorbent, g.p.l. | Final Volume, ml. | Final Solution Analysis, Grams per litre | | Adsorbent Metal | Lead Removed, percent |
|---|---|---|---|---|---|
| | | Cu | Pb | | |
| 0.76 VO(OH)$_2$ | 5,050 | 117.9 | <.004 | Nil | 99.2 |
| 0.76 VO(OH)$_2$ | 5,060 | 123.3 | <.006 | Nil | 98.8 |
| 5.0 Fe(OH)$_3$ | 1,050 | 108.4 | 0.017 | 0.072 Fe | 96.4 |
| 5.0 Fe(OH)$_3$ | 1,000 | 78.4 | 0.008 | 0.046 Fe | 98.4 |
| 5.0 Ti(OH)$_4$ | 1,525 | 88.8 | Nil | Nil | ~100 |
| 5.0 Ti(OH)$_4$ | 1,400 | 87.1 | <0.0028 | Nil | ~100 |
| 5.0 Ti(OH)$_4$ | 1,460 | 102.3 | Nil | Nil | ~100 |
| 5.0 MnO$_2$.aq | 1,200 | 86.0 | 0.03 | 0.15 Mn | 92.8 |
| 5.0 MnO$_2$.aq | 1,325 | 90.1 | 0.026 | 0.12 Mn | 81.7 |
| 5.0 MnO$_2$.aq | 1,330 | 101.1 | 0.038 | 0.18 Mn | 90.4 |
| 5.0 Al(OH)$_3$ | 1,175 | 100.4 | 0.16 | 0.08 Al | 62 |
| 5.0 Cr(OH)$_3$ | 1,150 | | 0.32 | Nil | 26 |
| 5.0 Bi(OH)$_3$ | 1,350 | 98.1 | 0.31 | Nil | 18 |
| 5.0 TiO$_2$ | 1,150 | 64.3 | 0.40 | 0.004 Ti | 10 |
| 5.0 H$_2$SiO$_3$ | 1,585 | | 0.25 | 0.054 Si | 12 |

NOTE:
The final solution may be greater in volume than the initial volume due to the addition of wash water in filtering.
MnO$_2$.aq = an aqueous solution of manganese dioxide.

The above results indicate that all the metal hydroxides tested have the capacity of adsorbing lead from a solution. Some, such as vanadium, iron, titanium and manganese hydroxides, have improved capacity over others such as bismuth, aluminum and chromium hydroxides.

EXAMPLE 2

This example illustrates the effect of using varying amounts of ferric and titanium hydroxide in the treatment of a solution which contained lead and copper. The solution contained:

| | Grams per litre |
|---|---|
| Copper | 127 |
| Lead | 0.68 |
| Zinc | 31 |
| Ammonia | 147 |
| Carbon dioxide | 99.7 |

1,000 ml. of this solution was agitated for 15 minutes at 80° F. in each test. The results obtained are set out in Table 2. The results are based on the amount of lead contained initially in the respective solutions subjected to treatment.

This example illustrates that the best results are obtained when the metal hydroxide is added to the solution within the range of from about 4 to about 10 grams of metal hydroxide per gram of lead in the solution subjected to treatment.

EXAMPLE 3

This example illustrates the results obtained in coating a filter with a metal hydroxide and filtering the copper-lead bearing solution through the filter. The solution contained 124 grams per litre copper, and 0.5 gram per litre lead. The vanadyl hydroxide was prepared by adding an excess of ammonia to a solution of vanadyl sulphate prepared by dissolving from 215 grams of vanadyl sulphate, VOSO$_4$.2H$_2$O, in 100 ml. of 1:1 sulphuric acid. Vanadyl hydroxide was recovered by filtration and applied to the filter cloth as a film or coating. The copper-lead bearing solution was passed through the filter. The results obtained are set out in Table 3.

Table 3

| VO provided as VO(OH)$_2$ Per Litre | No. of Passes through filter | Temp., °F. | Solution, Volume | | Solution Analysis, Grams per litre | | Residue Analysis, percent | |
|---|---|---|---|---|---|---|---|---|
| | | | Initial, ml. | Final, ml. | Cu | Pb | Cu | Pb |
| 0.64 g.p.l | 5 | 150 | 500 | 600 | 111.4 | 0.016 | 41.8 | 13.5 |
| 0.64 g.p.l | 10 | 75 | 500 | 500 | 121.0 | 0.016 | 24.0 | 35.9 |
| 1.28 g.p.l | 1 | 100 | 1,000 | 996 | 124.9 | 0.008 | 24.7 | 36.4 |

EXAMPLE 4

This example illustrates the use of metal hydroxides for the removal of lead from solutions which contain major quantities of copper. Thus, solution No. I contained 0.5 gram per litre lead as lead acetate. 1000 mls. of this solution was used for each test. The metal hydroxide was retained in contact with the solution for 15 minutes at 78° F.

The second solution, solution No. II, contained about 38 grams per litre nickel. This solution was an ammoniacal ammonium-sulphate solution in which the ratio of moles of nickel plus cobalt to the moles of ammonia not combined with ammonium sulphate was 1 to 5. The lead concentration in this solution, added as lead acetate, was 1.1 grams per litre. 250 mls. of this solution was used for each test. The hydroxide was agitated with the solution for 15 minutes at 78° F.

The results obtained with both of these solutions are set out in Table 4.

Table 2

| Adsorbent, g.p.l. | Hydroxide to Lead Ratio | Solution, Final Volume, ml. | Pb, g.p.l. | Adsorbent | Lead Distribution, percent | | Residue | |
|---|---|---|---|---|---|---|---|---|
| | | | | | Solution | Residue | Weight, grams | Pb, percent |
| 1—Ti(OH)$_4$ | 1.25:1 | 1,300 | 0.25 | 0.0022 Ti | 48.21 | 51.4 | 1.1 | 26.2 |
| 2—Ti(OH)$_4$ | 2.50:1 | 1,310 | 0.18 | 0.025 Ti | 29.6 | 70.4 | 2.4 | 19.4 |
| 3—Ti(OH)$_4$ | 2.75:1 | 1,360 | 0.16 | 0.004 Ti | 23.46 | 75.86 | 3.2 | 17.8 |
| 4—Ti(OH)$_4$ | 5.00:1 | 1,380 | 0.023 | 0.037 Ti | 4.60 | 95.4 | 7.5 | 8.37 |
| 5—Ti(OH)$_4$ | 6.25:1 | 1,395 | 0.014 | 0.007 Ti | 2.34 | 96.76 | 5.3 | 12.4 |
| 8—Ti(OH)$_4$ | 10:1 | 1,185 | 0.003 | | 0.5 | 99.5 | 18.6 | 4.0 |
| 1—Fe(OH)$_3$ | 1.25:1 | 1,100 | 0.54 | 0.003 Fe | 75 | 25 | 4.9 | 4.1 |
| 3—Fe(OH)$_3$ | 3.75:1 | 1,115 | 0.24 | 0.003 Fe | 34.5 | 65.5 | 8.6 | 6.1 |
| 5—Fe(OH)$_3$ | 6.25:1 | 1,100 | 0.19 | 0.009 Fe | 24.6 | 75.4 | 14.4 | 4.5 |
| 8—Fe(OH)$_3$ | 10:1 | 1,105 | 0.09 | 0.032 Fe | 12 | 88.0 | 24 | 3.06 |

Table 4

| Solution | Hydroxide Used | Wt. of Hydroxide | Ratio Hydroxide to Pb in Solution | Volume, ccs. | Purified Solution Analyses, g./l. | | | Lead-bearing residue | |
|---|---|---|---|---|---|---|---|---|---|
| | | | | | Pb | Fe | Ti | wt., gms. | Pb, percent |
| No. I | Ti(OH)₄ | 5 | 10 | 1,150 | <.003 | n.a. | nil | 6.0 | 9.08 |
| No. I | Fe(OH)₃ | 10 | 20 | 1,150 | <.001 | .001 | n.a. | 9.5 | 5.75 |
| No. II | Ti(OH)₄ | 1.25 | 4.5 | 300 | <.001 | h.a. | .002 | 3.0 | 9.68 |
| No. II | Fe(OH)₃ | 2.5 | 9.0 | 310 | <.01 | .001 | n.a. | 4.3 | 6.06 |

The metal hydroxide floc can be separated from the adsorbed lead and recovered very easily by leaching the floc with an acid, such as aqueous sulphuric acid solution, in which the metal hydroxide is soluble and the adsorbed lead is insoluble. Aqueous sulphuric acid can be separated from the lead, such as by filtration. The resulting clarified solution can be reacted with a hydroxide for the reprecipitation of the metal hydroxide which can be recovered in the manner described above.

The hydroxide residue after use can be regenerated, if desired, by leaching it with a known solvent which dissolves lead but which does not dissolve the metal hydroxide. Thus, used titanium hydroxide can be effectively regenerated by washing several times with acetic acid. The acetic acid dissolves the lead and leaves the hydroxide ready for use in a following lead removal operation.

The improved process of this invention has been described in detail as applied to the treatment of copper-lead bearing ammoniacal ammonium carbonate solutions. It will be understood that it is equally applicable to the treatment of silver-lead, nickel-lead and cobalt-lead bearing solutions other than ammoniacal ammonium carbonate solutions.

What we claim as new and desire to protect by Letters Patent of the United States is:

1. In a hydrometallurgical process for producing a non-ferrous metal selected from the group consisting of silver, copper, nickel and cobalt substantially free from lead from metal bearing material which contains values of lead and of at least one of said metals in which the metal bearing material is leached with a leach solution to extract and dissolve at least one of said metals in the solution and leach solution is separated from undissolved residue, the improvement which comprises the steps of contacting clarified leach solution with the hydroxide floc of a metal selected from the group consisting of titanium, vanadium, chromium, manganese and iron which is insoluble in the solution whereby lead present in the solution is adsorbed by the metal hydroxide floc, and thereafter separating leach solution from said metal hydroxide floc.

2. The process according to claim 1 in which the solution is contacted with the metal hydroxide in the ratio of metal hydroxide to lead within the range of from about 4:1 to about 10:1 by weight.

3. The process according to claim 1 in which adsorbed lead is separated from the metal hydroxide floc separated from the treated leach solution, the metal hydroxide is regenerated, and regenerated metal hydroxide floc is recycled to the solution treatment step.

4. The process according to claim 1 in which leach solution is reacted with the hydroxide floc of a metal selected from the group consisting of titanium, vanadium, chromium, manganese and iron dispersed throughout the solution subjected to treatment.

5. The process according to claim 1 in which leach solution is passed through a filter coated with the hydroxide floc of a metal selected from the group consisting of titanium, vanadium, chromium, manganese and iron.

6. In a hydrometallurgical process for producing copper substantially free from impurities from copper bearing material which contains lead in which the copper bearing material is leached with an ammoniacal ammonium carbonate solution to extract copper from the copper bearing material and dissolve it in the leach solution and leach solution is separated from undissolved residue, the improvement which comprises the steps of contacting clarified ammonium carbonate solution with the hydroxide floc of a metal selected from the group consisting of titanium, vanadium, chromium, manganese and iron which is insoluble in the solution whereby lead present in the solution is adsorbed by the metal hydroxide floc, and thereafter separating leach solution from said metal hydroxide floc.

7. The process according to claim 6 in which metal hydroxide floc is dispersed in the clarified ammoniacal ammonium carbonate leach solution.

References Cited in the file of this patent

UNITED STATES PATENTS

| | | |
|---|---|---|
| 2,696,431 | Kidd | Dec. 7, 1954 |
| 2,806,784 | Martiny | Sept. 17, 1957 |
| 2,923,618 | Redemann et al. | Feb. 2, 1960 |
| 2,927,018 | Redemann | Mar. 1, 1960 |

FOREIGN PATENTS

| | | |
|---|---|---|
| 644,743 | Great Britain | Oct. 18, 1950 |

OTHER REFERENCES

"Behavior of Ion Exchange Resins in Solvents Other Than Water," Bodamer et al., Industrial and Engineering Chemistry, vol. 45, No. 11, pages 2577–2580.